3,650,972
LIQUID ACYL SULFONYL PEROXIDE-SOLVENT
COMPOSITIONS
Jose Sanchez, Grand Island, N.Y., assignor to Pennwalt
Corporation, Philadelphia, Pa.
No Drawing. Filed Nov. 7, 1969, Ser. No. 874,990
Int. Cl. C07c 73/00; D06l 3/02
U.S. Cl. 252—186                                  11 Claims

ABSTRACT OF THE DISCLOSURE

Storage stable compositions, liquid below $-10°$ C., are formed by liquid acyl sulfonyl peroxides and liquid polar or polarizable solvents. Example: A composition of 70 weight percent of acetyl sec-heptyl sulfonyl peroxide and 30 weight percent of dimethyl phthalate, is liquid at $-80°$ C., shock stable, and has essentially no loss in assay after 4 weeks storage at 0° C.

BACKGROUND OF THE INVENTION

(1) Field of the invention

This invention relates to liquid acyl sulfonyl peroxide solution compositions, which solutions remain liquid at temperatures of about $-10°$ C.

(2) Description of the prior art

Acyl sulfonyl peroxides are very efficient initiators for vinyl monomer polymerization, especially vinyl chloride, in the 30°–60° C. temperature range. These peroxides in their pure form, i.e., neat, are very sensitive to shock, have low thermal stability, and are sensitive to amines. The hazard in using these peroxides is decreased by using them in the form of solutions or slurries in water medium.

The solid acyl sulfonyl peroxides have very limited solubilities in solvents in the temperature range at which these peroxides must be stored, i.e., from about $-10°$ to about $-20°$ C. In most solvents, the maximum solubility to avoid phase separation or solidification is about 30% by weight of the peroxide.

Some known solid acyl sulfonyl peroxides are: acetyl cyclohexyl sulfonyl peroxide; acetyl t-pentyl sulfonyl peroxide; acetyl t-butyl sulfonyl peroxide, and acetyl 3-chloro-1-methylpropyl sulfonyl peroxide.

British Pat. No. 1,069,232 describes solid low shock sensitive acyl sulfonyl peroxide compositions. French Pat. No. 1,367,074 describes the use of acyl sulfonyl peroxides in vinyl chloride polymerization.

SUMMARY OF THE INVENTION

It has been discovered that certain liquid acyl sulfonyl peroxides and liquid polar polarizable solvents permit the formation of concentrated solutions which on storage at about $-10°$ C. do not solidify or form separate phases, yet have significantly better sensitivity to shock and better thermal stability than the neat peroxides themselves.

The liquid composition of the invention consists essentially of between about 30% and about 75%, by weight, of normally liquid acyl sulfonyl peroxide and between about 70% and about 25%, by weight, of a polar or polarizable liquid solvent for the peroxide. The liquid acyl sulfonyl peroxide used in the composition of the invention has the formula:

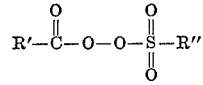

where, R′ and R″ are each selected from the class consisting of (a) alkyl having 1–12 carbon atoms and (b) cycloalkyl having 4–10 carbon atoms in the ring and not more than a total of 12 carbons. It is preferred that R″ be sec-alkyl having 4–10 carbon atoms; or cycloalkyl having 4–6 ring carbon atoms.

Illustrative compositions of the invention are: 50–75% of acetyl sec-heptyl sulfonyl peroxide and 50–25% of methanol or toluene or dimethyl phthalate.

DESCRIPTION OF THE INVENTION AND WORKING EXAMPLES

It is to be emphasized that the acyl sulfonyl peroxides utilized in the compositions of the invention are normally liquid compounds, even though the formula definition previously given reads on some peroxides which are normally solid—the normally solid peroxides are excluded from the instant invention, as will be evident from the working examples.

R′ and R″ may each be alkyl having 1–12 carbon atoms or cycloalkyl having 4–10 carbon atoms in the ring and not more than a total of 12 carbon atoms. It is preferred that R′ be lower alkyl, i.e., having 1 to about 8 carbon atoms. Alkyl groups within this carbon atom number range are well known and it is not deemed necessary to present a long list of handbook radicals.

The cycloalkyl radical may be a single ring, a fused ring, or a bi-ring. Illustrative rings are cyclobutyl, cyclopentyl, cyclohexyl, cycloheptyl, cyclodecyl, decalyl, and these rings may be substituted with one or more alkyl groups.

It is preferred that the R″ group be a sec-alkyl group having 4–10 carbon atoms, such as, sec-butyl, sec-heptyl, and sec-decyl. Also, that R″ be cycloalkyl having 5–6 ring carbon atoms.

Illustrative liquid acyl sulfonyl peroxides coming within the above definition are: acetyl sec-butyl sulfonyl peroxide, acetyl sec-pentyl sulfonyl peroxide, acetyl sec-hexyl sulfonyl peroxide, acetyl sec-heptyl sulfonyl peroxide, acetyl sec-nonyl sulfonyl peroxide, acetyl cyclopentyl sulfonyl peroxide, acetyl 1-methylcyclopentyl sulfonyl peroxide, and acetyl 1-methylcyclohexyl sulfonyl peroxide.

The composition of the invention includes, in addition to the peroxide, a polar or polarizable liquid solvent. The solvent must have a melting point such that the solution composition of the invention will exhibit no solid formation or phase separation at a temperature of about $-10°$ C., which is about the ordinary storage temperature used in industry for acyl sulfonyl peroxides.

Although, the lower point of the peroxide concentration range is given as about 30%, by weight, it is to be understood that there is nothing critical about this point because the defined liquid peroxide-solution-compositions containing less than this amount are operative when the industry wants such a diluted amount of peroxide. The upper point of the range has been defined as about 75%, by weight, of peroxide. Here the upper limit is determined by the sensitivity to shock of the composition and also the thermal stability; thus this upper limit will vary somewhat with the particular peroxide, the particular solvent, or the combination of peroxide and solvent. The solution composition may tolerate more than 75% in some instances and less in other instances; however, here the variation may be about ±5%.

The more concentrated solutions are preferred and usually the composition of the invention will contain about 50–75%, by weight, of the peroxide with the remainder being solvent.

It has been observed that any polar solvent or polarizable solvent that is inert to the peroxide and has the proper melting point may be used in the composition of the invention. A polar solvent can be defined as a solvent which possesses at least one polar bond in its structure (i.e., a bond created between two atoms with different electronegativities, that is, bonds such as C—O, C—N, C—Cl, N—O, etc.). Carbon tetrachloride can be considered a polar solvent under this definition even though it does not possess a dipole moment.

A polarizable solvent is one which possesses π electrons which can be distorted by a polar solute (i.e. have a dipole induced in it), hence bringing about interaction between solute and solvent. It is this interaction which allows benzene to solvate polar compounds. Some solvents, e.g. certain benzene derivatives, can be both polar and polarizable.

A list of classes of such solvents coming within the broad scope is given hereinafter for purposes of illustration and not as any limitation on the scope of the invention.

Polar solvents (a) Haloaromatic hydrocarbons and nitroaromatic hydrocarbons, such as, monochlorobenzene, dichlorobenzene, and nitrobenzene.

(b) Polyhaloalkanes and polyhaloalkenes, such as, carbon tetrachloride, trichloroethane, methylene chloride, ethylene dichloride, trichloroethylene, perchloroethylene, and propylene dichloride.

(c) Alkyl cyanides having 2–4 carbon atoms, such as, acetonitrile, propionitrile, and butyronitrile.

(d) Lower alkanoic acids, such as, acetic acid, propionic acid, isobutyric acid, and valeric acid.

(e) Dialkyl ethers and heterocyclic ethers having only carbon and oxygen in the ring, such as, diethyl ether, ethyl isopropyl ether, dibutyl ether, furan, tetrahydrofuran, and dioxane.

(f) Lower alkanols and lower alkoxyalkanols (ether alcohols), such as, methanol, ethanol, isopropanol, sec-butanol, methyl-pentanol, t-pentanol, ethylhexanol, isodecyl alcohol, and methoxybutyl alcohol.

(g) Lower alkanones and cycloalkanones, such as, acetone, methyl ethyl ketone, dibutyl ketone, pentanone, cyclohexanone, trimethyldihydroisophorone, and diacetone alcohol.

(h) Alkyl esters of alkanoic acids, alkanedioic acids, alkenedioic acids, cycloalkanoic acids, aryl carboxylic acids and citric acid, such as, methyl acetate, ethyl acetate, butyl acetate, amyl acetate, octyl acetate, isobutyl isobutyrate, butyl propionate, dioctyl adipate, didecyl adipate, diethyl maleate, dibutyl maleate, dioctyl sebacate, diisodecyl azelate, tributyl citrate, diethyl phthalate, didecyl phthalate, dimethyl phthalate, ditridecyl phthalate, and diphenyl phthalate.

(i) Alkyl esters of alkanediols, such as, diisobutyrate of 2,2,4 - trimethyl - 1,3 - pentanediol, ethylene glycol mono butyl ether acetate, diethylene glycol mono butyl ether acetate, diethylene glycol mono ethyl ether acetate, and ethylene glycol mono ethyl ether acetate.

(j) Tri(lower alkyl) phosphate, lower alkoxy phosphates, and triaryl phosphates, such as tributyl phosphate, tributoxy ethyl phosphate, and tricresyl phosphate.

Polarizable solvents

Aromatic hydrocarbons, haloaromatic hydrocarbons, and nitroaromatic hydrocarbons, such as:

benzene
toluene
ethylbenzene
xylene
monochlorobenzene
dichlorobenzene
nitrobenzene Procedures for preparing the compositions of the invention In one procedure "neat," i.e., substantially pure or pure, sulfonyl peroxide as defined is blended with the liquid solvent at about 0° to about +10° C. using adequate cooling. A clear liquid solution composition is readily obtained.

Because the handling of "neat" sulfonyl peroxide is somewhat hazardous at best, the following is a preferred preparatory procedure: The sulfoxidation of alkane in the presence of acetic anhydride results in the formation of an oily product mixture containing 50–60% of the sulfonyl peroxide. This oily material is blended with the desired amount of the liquid solvent, which may be the solvent used in the preparation, wanted for the composition. This solution is then digested with water at about +10° C. for about 0.5 hour; separated, and the organic material washed several times with water; the organic material is then dried by contact with a solid desiccant, e.g. anhydrous magnesium sulfate, and then filtered to remove the solid, giving a clear liquid solution composition of sulfonyl peroxide and solvent. The solution may be adjusted to give the exact desired solvent content by adding more solvent.

Working examples

The various compositions were evaluated by these criteria: The physical state of the composition at 0° C. and even lower. The sensitivity of the composition to impact shock. The so-called Pressure Vessel Test. Loss of assay, i.e., decrease in peroxy oxygen content, on storage in a closed container at constant temperature.

Pressure vessel test (PVT): The tester consisted of a cylindrical steel vessel (235 cc. volume) with a variable aperture disc in the side wall, closed at the top with a rupture disc. An aluminum rupture disc, crowned in shape, prestressed to 90% of its burst strength and rated at 98–100 p.s.i.g. was used. There are 74 discs varying in an exponential progression from 1 mm. to 24 mm.

On rapidly heating a material in the tester, the disc bursts or remains intact, depending on the force developed by the decomposition and the amount of venting supplied by the bore in the particular aperture disc used. The bore size of the disc needed to prevent disc rupture is a measure of the violence of the decomposition and the amount of gas generated.

It was determined that a 5.0 g. sample gave reproducible results; these could be used for comparative purposes. Because it is a well-known, widely used, and well-tested material, benzoyl peroxide (98% purity) was tested to provide a base line; the rupture disc burst at 14.9 mm. vent aperture.

Impact shock sensitivity test (ISST).—A modified Du Pont impact testing apparatus was used. In these tests a 5.0 kilogram weight was dropped on the sample a measured distance to determine impact shock sensitivity. Sensitivity to impact shock is shown by noise (report), smoke, or by obvious decomposition of the sample. The maximum drop of the apparatus was 36 inches; failure to show signs of sensitivity at this drop is reported hereinafter as "None."

Loss of assay.—In this test, a sample of the peroxide was placed in a closed glass bottle and held in a constant temperature container for 4 weeks. Then the peroxide was analyzed (assayed) for peroxy oxygen content. The arithmetic difference between the original assay of the sample and the final assay of the sample multiplied by 100% and divided by the original assay of the sample is reported as the "loss of assay."

EXAMPLE I

Acetyl sec-heptyl sulfonyl peroxide and dimethyl phthalate

Two solution compositions of the invention were prepared by blending dimethyl phthalate (DMP) and neat acetyl sec-heptyl sulfonyl peroxide: (1) this composition contained equal amounts of the two components, and (2) this composition contained 70 wt. percent of the peroxide and 30 wt. percent of the DMP. These two compositions were tested using the above tests; the results of the tests are shown in Table I.

TABLE I

| Test | 50% peroxide | 70% peroxide | Neat peroxide |
|---|---|---|---|
| State: | | | |
| 0° C | Liquid | Liquid | Liquid |
| −80° C | Liquid | Liquid | Liquid |
| ISST, inches | None | None | <1 |
| PVT, mm | 1.0 | 10.5 | >20 |
| Loss of assay (percent): | | | |
| 0° C | 1 | | |
| −10° C | 1 | 0 | |

Table I demonstrates that compositions of the invention can be stored at 0° C. with insubstantial loss of assay, and that the compositions have very significantly better qualities of ISST and PVT than does the neat peroxide. (The above compositions are acceptable for commercial shipping and storage whereas the neat peroxide is not so acceptable.)

EXAMPLE II

Comparison of compositions (1) and (2) of Example I with two commercial acetyl cyclohexylsulfonyl peroxide formulations Two commercial formulations containing acetyl cyclohexyl sulfonyl peroxide (ACSP) are available. (A) consists of 71 weight percent of dimethyl phthalate and 29 weight percent of ACSP. (B) consists of a wet granular, non-flowing, mix of 64 wt. percent of ACSP and 36 wt. percent of water. These four compositions were tested as described earlier; the results of these tests are set out in Table II.

TABLE II

| Test | Composition 1 | Composition 2 | Formulation A | Formulation B |
|---|---|---|---|---|
| State: | | | | |
| 0° C | Liquid | Liquid | Liquid | Solid |
| −80° C | Liquid | Liquid | Solid | Solid |
| ISST, inches | None | None | None | None |
| PVT, mm | 1.0 | 10.5 | 1.0 | 11.0 |
| Loss of assay (percent): | | | | |
| 0° C | 1 | | 8.8 | |
| −10° C | 1 | 0 | 0 | |

The formulation (A) represents about a saturated solution of ACSP in DMP at about 0° C. and the solubility decreases rapidly as temperature decreases. The data of Table II show that compositions of the inventions are at least equal in safety to the two commercial formulations now available. However, the higher concentration of peroxide possible in compositions of this invention over formulations (A) and (B), taken with the ability to remain liquid at Dry Ice temperature make these clearly superior to the commercial formulations now available.

EXAMPLE III

Neat acetyl sec-heptyl sulfonyl peroxide and neat acetyl cyclohexyl sulfonyl peroxide were dissolved in various polar or polarizable solvents, in various concentrations, at room temperature. Portions of the solutions were cooled to 0° C., −20° C. and −78° C., respectively. Each sample was graded "Passed" if a homogeneous liquid was observed at the cooled temperature and graded "failed" if phase separation or solidification was observed at the cooled temperature.

In the case of acetyl cyclohexyl sulfonyl peroxide, solutions were prepared containing, on a weight basis, 30%, 40%, and 50% of the peroxide respectively; the remainder being solvent.

In the case of acetyl sec-heptyl sulfonyl peroxide, solutions were prepared containing, on a weight basis, 30%, 50%, 67%, and 75% of the peroxide, respectively; the remainder being solvent.

The solvents used in this Example III are listed in Table III.

Of the solid acetyl cyclohexyl sulfonyl peroxide-solutions: at 0° C., only four of the 50% solutions Passed, namely, trichloroethylene, acetonitrile, ethyl acetate and acetone. At 0° C., only six of the 40% solutions Passed, namely, toluene, methylene chloride, trichloroethylene, acetonitrile, ethyl acetate, and acetone. At 0° C., eleven of the 30% solutions Passed, namely, toluene methylene chloride, trichloroethylene, acetonitrile, propionic acid, diethyl ether, diethyl maleate, dibutyl maleate, dimethyl phthalate, ethyl acetate and acetone, and tricresyl phosphate.

TABLE III

| Number | Solvent | M.P. (° C.) | B.P. (° C.) |
|---|---|---|---|
| 1 | Toluene | −95 | 110 |
| 2 | Methylene chloride | −97 | 39 |
| 3 | Trichloroethylene | −73 | 86 |
| 4 | Acetonitrile | −41 | 80 |
| 5 | Acetic acid | +17 | 118 |
| 6 | Propionic acid | −22 | 140 |
| 7 | Diethyl ether | −116 | 35 |
| 8 | Diethyl maleate | | [1] 115 |
| 9 | Dibutyl maleate | | [2] 127 |
| 10 | TXIB [3] | | 280 |
| 11 | Dioctyl adipate | | 417 |
| 12 | Dioctyl sebacate | | 395 |
| 13 | Dimethyl phthalate | +2 | 283 |
| 14 | Ethyl acetate | −84 | 76 |
| 15 | Acetone | −95 | 56 |
| 16 | Methanol | −98 | 65 |
| 17 | Ethanol | −114 | 78 |
| 18 | Isopropanol | −88 | 82 |
| 19 | n-Butanol | −89 | 118 |
| 20 | t-Butanol | +25 | 83 |
| 21 | t-Pentanol | −12 | 100 |
| 22 | Ethylene glycol | −31 | 195 |
| 23 | Tricresyl phosphate | | [4] 263 |

[1] 22 torr.
[2] 4 torr.
[3] KodaFlex brand of diisobutyrate of 2,2,4-trimethyl-1,3-pentanediol.
[4] 20 torr.

Of the ACSP solutions at −20° C., only acetonitrile and acetone Passed at 50%; and at 40% only acetonitrile, ethyl acetate and acetone Passed. At 30% solution seven of the solutions Passed, namely, toluene, methylene chloride, acetonitrile, diethyl maleate, dimethyl phthalate, ethyl acetate, and acetone.

Of the ACSP solutions at −78° C., none Passed at 50%, or 40% concentration. At 30% concentration, only three solutions Passed, namely, toluene, ethyl acetate, and acetone.

Of the acetyl sec-heptyl sulfonyl peroxide solutions: at 0° C., only two solutions Failed at each of 30%, 50%, 67%, and 75% concentrations, namely, in each instance, t-butanol and ethylene glycol.

At −20° C. only three solutions Failed at each of 30%, 50%, 67%, and 75%; t-butanol and ethylene glycol being joined by acetic acid.

At −78° C., fifteen solutions Passed and eight Failed. At 30% and at 50%, the solutions which Failed were: acetonitrile, acetic acid, propionic acid, isopropanol, n-butanol, t-butanol, t-pentanol, and ethylene glycol. At 67% and at 75%, ethanol solvent solutions received a Failing grade. However, in a display of anomalous behaviour the acetonitrile solutions at 67% and 75% concentrations received a Passing grade.

The above data establish that there is a radically different behavior of these solvents with the solid acetyl cyclohexyl sulfonyl peroxide and with the liquid acetyl sec-heptyl sulfonyl peroxide.

Discussion of Example III.—In industry, the usual safe storage and handling temperature for acyl sulfonyl peroxides is between about −10° and −20° C., which range applies both to neat peroxide and to solutions.

It can be seen from the above data that in order to meet this temperature range without phase separation or solidification, the solid acyl sulfonyl peroxide-solutions must contain not more than about 30% of the peroxide in a small number of solvents; and some of this small number have disadvantages with regard to safety. Low boiling solvents, such as, methylene chloride and acetone, are undesirable because evaporation of the solvent from the solution can result in an increase in concentration of the peroxide in the residual composition to a level where the residual composition is hazardous in storage and in handling. It is pointed out that the solid acyl sulfonyl peroxides have their greatest solubility in lower boiling solvents.

In many industrial operations, the solvent is not wanted in the final product and therefore the less solvent present in the peroxide solution the better. The above data show that concentrations containing at least 75% of liquid acyl sulfonyl peroxide using a wide range of solvents can be safely stored without concern for phase separation or solidification at industrial storage temperatures.

The alkanol solvents show a marked behavior in favor of the liquid acyl sulfonyl peroxides. The solid ACSP is less than 30% soluble in methanol at 0° C., whereas the liquid sulfonyl peroxide is soluble up to at least 75%, forming relatively low viscosity solutions which are homogeneous down to Dry Ice temperatures. Down to temperatures on the order of −20° C., t-pentanol is a good solvent for the liquid sulfonyl peroxides; down to this temperature, the two appear to be miscible in all proportions. The water soluble alkanols are attractive solvents for use in the polymerization of vinyl chloride, etc., in the suspension and emulsion processes; the polyvinyl chloride polymer is free from solvent, since the solvent passes into the water phase.

A major advantage of the liquid acyl sulfonyl peroxides is that they are miscible, in all proportions, with the so-called plasticizer solvents, such as solvents numbers 7–13 and 23 in Table III. On the other hand, the solid ACSP has only 30% solubility at 0° C. in only 4 of these; and at −20° C., passes at the 30% level in 2 of them. For most PVC uses, the producers desire to keep the amount of plasticizer added with the peroxide catalyst as low as possible; thus a high concentration solution that is storable without phase separation or solidification is a boon.

EXAMPLE IV

The same procedure as used in Example III was employed in this example which compares the solubilities at 30% and 50% weight levels of liquid (at or below −78° C.) acyl sulfonyl peroxides, such as acetyl sec-heptylsulfonyl peroxide, acetyl cyclopentylsulfonyl peroxide and acetyl 1-methylcyclohexylsulfonyl peroxide, with solid acyl sulfonyl peroxides, such as acetyl cyclohexylsulfonyl peroxide (M.P. 33–5° C.) and acetyl t-butylsulfonyl peroxide (M.P., 35–7° C.), in a more limited series of solvents. The solvents employed are listed in Table IV below.

TABLE IV

| Number | Solvent | M.P. (° C.) | B.P. (° C.) |
|---|---|---|---|
| 1 | Dimethyl phthalate | +2 | 283 |
| 2 | Diethyl phthalate | | 298 |
| 3 | Dioctyl adipate | | 417 |
| 4 | Dibutyl maleate | | ¹127 |
| 5 | Diethyl carbonate | −43 | 126 |
| 6 | Methanol | −98 | 65 |

¹ 4 torr.

At the 30% weight level all three liquid acyl sulfonyl peroxides Passed the solubility tests in all six solvents at 0° C., −20° C. and −78° C.

At the same level the solid, acetyl t-butylsulfonyl peroxide, Passed the 0° C. tests in all solvents other than methanol and Failed the tests in all six solvents at −20° C. and −78° C. At 0° C. the solid, acetyl cyclohexylsulfonyl peroxide, Failed in dioctyl adipate and methanol, at −20° C. it Failed in dioctyl adipate, methanol and dibutyl maleate and at −78° C. it Failed in dioctyl adipate, methanol, dibutyl maleate and dimethyl phthalate.

At the 50% weight level all three liquid acyl sulfonyl peroxides Passed the solubility tests in all six solvents at 0° C., −20° C. and −78° C. whereas the solid acyl sulfonyl peroxides Failed the solubility tests in all six solvents at 0° C., −20° C. and −78° C.

The above data demonstrate that the liquid acyl sulfonyl peroxides have very significantly greater solubilities in these solvents than have the solid acyl sulfonyl peroxides.

Thus having described the invention what is claimed is:

1. A liquid solution composition exhibiting no solid formation or phase separation at a temperature of about −10° C., which composition consists essentially of:
  (1) between about 30% and about 75%, by weight normally liquid acyl sulfonyl peroxide having the formula:

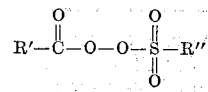

where, R′ and R″ are each selected from the class consisting of (a) alkyl having 1–12 carbon atoms and (b) cycloalkyl having 4–10 carbon atoms in the ring and not more than a total of 12 carbon atoms; and
  (2) between about 70% and about 25%, by weight of a polar or polarizable liquid solvent for said peroxide, said solvent being inert to said peroxide and having the proper melting point to provide said liquid solution composition.

2. The composition of claim 1 where R″ is sec-alkyl having 4–10 carbon atoms.

3. The composition of claim 1 where R″ is cycloalkyl having 5–6 ring carbon atoms.

4. The composition of claim 1 where R′ is lower alkyl.

5. The composition of claim 1 where said peroxide is acetyl sec-heptyl sulfonyl peroxide.

6. The composition of claim 1 where said peroxide is acetyl 1-methylcyclohexyl sulfonyl peroxide.

7. The composition of claim 1 where said peroxide is acetyl cyclopentyl sulfonyl peroxide.

8. The composition of claim 1 where said liquid solvent is selected from the class consisting of:
  (a) aromatic hydrocarbons, nitroaromatic hydrocarbons and haloaromatic hydrocarbons;
  (b) polyhaloalkanes and polyhaloalkenes;
  (c) alkyl cyanides having 2–4 carbon atoms;
  (d) lower alkanoic acids;
  (e) dialkyl ethers and heterocyclic ethers having only carbon and oxygen in the ring;
  (f) lower alkanols and lower alkoxyalkanols;
  (g) lower alkanones and cycloalkanones;
  (h) alkyl esters of alkanoic acids, alkanedioic acids, alkenedioic acids, cycloalkanoic acids, aryl carboxylic acids, and citric acid;
  (i) alkyl esters of alkanediols; and
  (j) tri(lower alkyl) phosphates, lower alkoxy phosphates, and triaryl phosphates.

9. A liquid composition according to claim 8 wherein said peroxide is acetyl-sec-heptylsulfonyl peroxide, acetyl cyclopentylsulfonyl peroxide, or acetyl 1 - methylcyclohexylsulfonyl peroxide.

10. A liquid composition consisting of about 50–75%, by weight of acetyl sec-heptylsulfonyl peroxide and about 50–25%, by weight, of dimethyl phthalate.

11. A liquid composition consisting of about 50–75%, by weight, of acetyl sec-heptylsulfonyl peroxide and about 50–25%, by weight, of methanol.

References Cited

UNITED STATES PATENTS 3,466,255   9/1969   Faerber et al. _____ 260—610 R

RICHARD D. LOVERING, Primary Examiner

I. GLUCK, Assistant Examiner

U.S. Cl. X.R.

8—111; 252—95, 99; 260—610 A, 610 R, 610 D